US009229896B2

(12) United States Patent
Balkan et al.

(10) Patent No.: US 9,229,896 B2
(45) Date of Patent: Jan. 5, 2016

(54) SYSTEMS AND METHODS FOR MAINTAINING AN ORDER OF READ AND WRITE TRANSACTIONS IN A COMPUTING SYSTEM

(71) Applicant: Apple Inc., Cupertino, CA (US)

(72) Inventors: Deniz Balkan, Santa Clara, CA (US); Gurjeet S. Saund, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 13/724,886

(22) Filed: Dec. 21, 2012

(65) Prior Publication Data

US 2014/0181349 A1  Jun. 26, 2014

(51) Int. Cl.
*G06F 13/36* (2006.01)
*G06F 13/40* (2006.01)

(52) U.S. Cl.
CPC ........ *G06F 13/4027* (2013.01); *G06F 13/4059* (2013.01); *G06F 2213/0038* (2013.01)

(58) Field of Classification Search
CPC .................................................. G06F 13/4059
USPC ...................................... 710/52–57, 305–310
See application file for complete search history.

(56) References Cited

U.S. PATENT DOCUMENTS

| | | | |
|---|---|---|---|
| 3,311,885 A | 3/1967 | Propster, Jr. | |
| 5,247,672 A | 9/1993 | Mohan | |
| 5,420,991 A | 5/1995 | Konigsfeld et al. | |
| 5,535,340 A * | 7/1996 | Bell .................... | G06F 13/4027 710/107 |
| 5,649,110 A | 7/1997 | Ben-nun et al. | |
| 5,696,910 A * | 12/1997 | Pawlowski .......... | G06F 13/4217 709/224 |
| 5,721,857 A | 2/1998 | Glew et al. | |
| 5,742,772 A | 4/1998 | Sreenan | |
| 5,878,235 A * | 3/1999 | Porterfield .............. | G06F 13/36 710/112 |
| 6,047,051 A | 4/2000 | Ginzboorg et al. | |
| 6,070,209 A | 5/2000 | Hausauer | |
| 6,092,095 A | 7/2000 | Maytal | |
| 6,173,378 B1 * | 1/2001 | Rozario et al. ................. | 711/163 |
| 6,184,906 B1 | 2/2001 | Wang et al. | |
| 6,230,228 B1 | 5/2001 | Eskandari et al. | |

(Continued)

FOREIGN PATENT DOCUMENTS

CN    101419579    4/2009

OTHER PUBLICATIONS

P.A. Semi, "The PWRficient Processor Family," Oct. 2005, pp. 1-31.

(Continued)

*Primary Examiner* — Raymond Phan
(74) *Attorney, Agent, or Firm* — Rory D. Rankin; Meyertons, Hood, Kivlin, Kowert & Goetzel, P.C.

(57) ABSTRACT

Systems and methods for maintaining an order of read and write transactions for each source through a bridge in a bus fabric. The bridge provides a connection from a first bus to a second bus within the bus fabric. The first bus has a single path for read and write transactions and the second bus has separate paths for read and write transactions. The bridge maintains a pair of counters for each source in a SoC to track the numbers of outstanding read and write transactions. The bridge prevents a read transaction from being forwarded to the second bus if the corresponding write counter is non-zero, and the bridge prevents a write transaction from being forwarded to the second bus if the corresponding read counter is non-zero.

24 Claims, 7 Drawing Sheets

(56) References Cited

U.S. PATENT DOCUMENTS

| | | | |
|---|---|---|---|
| 6,324,616 | B2 | 11/2001 | Chrysos et al. |
| 6,442,707 | B1 | 8/2002 | McGrath et al. |
| 6,449,701 | B1 | 9/2002 | Cho |
| 6,473,832 | B1 | 10/2002 | Ramagopal et al. |
| 6,493,776 | B1 * | 12/2002 | Courtright et al. ............ 710/110 |
| 6,493,820 | B2 | 12/2002 | Akkary et al. |
| 6,622,237 | B1 | 9/2003 | Keller et al. |
| 6,732,208 | B1 * | 5/2004 | Alsaadi et al. ................ 710/112 |
| 6,738,881 | B1 | 5/2004 | Ollivier et al. |
| 6,784,890 | B1 | 8/2004 | Bergeson et al. |
| 6,804,757 | B2 | 10/2004 | Weber |
| 6,856,944 | B2 | 2/2005 | Hady et al. |
| 6,859,438 | B2 | 2/2005 | Haddock et al. |
| 6,996,654 | B2 * | 2/2006 | Adkisson et al. ............. 710/306 |
| 7,003,648 | B2 | 2/2006 | Chrysos et al. |
| 7,017,020 | B2 | 3/2006 | Herbst et al. |
| 7,139,859 | B2 | 11/2006 | Dastidar et al. |
| 7,162,546 | B2 | 1/2007 | Creta et al. |
| 7,274,700 | B2 | 9/2007 | Jin et al. |
| 7,346,063 | B1 | 3/2008 | Herbst |
| 7,353,310 | B2 | 4/2008 | Roever |
| 7,412,555 | B2 | 8/2008 | Wang |
| 7,472,260 | B2 | 12/2008 | Lien et al. |
| 7,535,898 | B2 | 5/2009 | Akella et al. |
| 7,539,143 | B2 | 5/2009 | Moores et al. |
| 7,647,444 | B2 | 1/2010 | Dignum et al. |
| 7,653,069 | B2 | 1/2010 | Lakshmanamurthy et al. |
| 7,675,925 | B2 | 3/2010 | Jones |
| 7,716,395 | B2 | 5/2010 | Sethi |
| 8,510,521 | B2 | 8/2013 | Biswas et al. |
| 2002/0095498 | A1 | 7/2002 | Chanda et al. |
| 2003/0202517 | A1 | 10/2003 | Kobayakawa et al. |
| 2004/0064623 | A1 | 4/2004 | Solomon |
| 2004/0081093 | A1 | 4/2004 | Haddock et al. |
| 2004/0103230 | A1 * | 5/2004 | Emerson et al. ............. 710/110 |
| 2004/0141516 | A1 | 7/2004 | Lee |
| 2005/0060456 | A1 | 3/2005 | Shrader et al. |
| 2005/0246441 | A1 | 11/2005 | Chandrasekaran et al. |
| 2007/0011396 | A1 | 1/2007 | Singh et al. |
| 2007/0073954 | A1 * | 3/2007 | Wang ............................ 710/309 |
| 2008/0181234 | A1 | 7/2008 | Arndt et al. |
| 2008/0215786 | A1 | 9/2008 | Goossens et al. |
| 2008/0244135 | A1 | 10/2008 | Akesson et al. |
| 2009/0043920 | A1 | 2/2009 | Kuris et al. |
| 2009/0070771 | A1 | 3/2009 | Yuyitung et al. |
| 2009/0147731 | A1 | 6/2009 | Chion et al. |
| 2009/0172318 | A1 | 7/2009 | Sugai et al. |
| 2009/0228535 | A1 | 9/2009 | Rathi et al. |
| 2009/0287865 | A1 | 11/2009 | Aldworth et al. |
| 2010/0049913 | A1 | 2/2010 | Marcu et al. |
| 2011/0197038 | A1 | 8/2011 | Henriksson et al. |
| 2011/0231588 | A1 * | 9/2011 | Meredith ...................... 710/110 |
| 2013/0086296 | A1 * | 4/2013 | Lakshmanamurthy et al. ............................ 710/314 |
| 2013/0086586 | A1 * | 4/2013 | Lakshmanamurthy et al. ............................ 718/100 |
| 2013/0159591 | A1 * | 6/2013 | Acuna et al. .................. 710/310 |
| 2013/0227121 | A1 * | 8/2013 | Dixon et al. .................. 709/224 |

OTHER PUBLICATIONS

PCI Express, "PCI Express(TM) Base Specification," Revision 1.0a, Apr. 15, 2003, pp. 90-97.
U.S. Appl. No. 12/883,848, filed Sep. 16, 2010.
U.S. Appl. No. 12/883,864, filed Sep. 16, 2010.
U.S. Appl. No. 12/883,878, filed Sep. 16, 2010.
Non-Final Office Action in related U.S. Appl. No. 12/883,878, dated Mar. 27, 2013, pp. 1-13.
Office Action from U.S. Appl. No. 12/883,864, dated Feb. 22, 2012, Apple Inc., 16 pages.
Office Action from U.S. Appl. No. 12/883,848, dated Mar. 12, 2012, Apple Inc., 18 pages.
Action from Netherlands Application No. NL2007411, dated Feb. 29, 2012, Apple Inc., 7 pages.
European Search Report for European App. No. 11180199.9 dated Dec. 29, 2011, 8 pages.
International Search Report and Written Opinion in PCT/US11/49940, mailed Dec. 22, 2011, 11 pages.

* cited by examiner

Computer Readable Medium 210

SYSTEMS AND METHODS FOR MAINTAINING AN ORDER OF READ AND WRITE TRANSACTIONS IN A COMPUTING SYSTEM

BACKGROUND

1. Field of the Invention

The present invention relates generally to the field of computer systems, and in particular to methods and mechanisms for maintaining an order of transactions in a bus fabric.

2. Description of the Related Art

Systems on chips (SoCs) are becoming increasingly complex with ever increasing numbers of agents and circuits within a typical SoC. Often, data will be shared among the different agents of the SoC, and a bus fabric may be utilized to connect the agents to each other. When an agent is generating and sending multiple transactions through the bus fabric, the agent expects the transactions to be processed in the order they were generated.

For example, if a CPU generates a write request for a specific location and then later issues a read request for the same location, the CPU expects these requests to be processed in order. Otherwise, if the read request is processed prior to the write request, the read request will receive stale data. Therefore, maintaining an order of transactions in the bus fabric is essential for ensuring the proper functioning of the SoC.

SUMMARY

Systems and methods for maintaining the order of transactions in a bus fabric are contemplated.

In one embodiment, the bus fabric of a system on chip (SoC) may utilize control logic for enforcing an order of transactions passing through the bus fabric. In one embodiment, transactions may traverse a bridge from a first bus with a first bus protocol to a second bus with a second bus protocol. The first bus may have a single connection path shared by both read and write transactions, while the second bus may have separate connection paths for read and write transactions. Read transactions sent from a given agent of the SoC may maintain their order in relation to write transactions while passing through the fabric on the first bus. However, when transactions are sent on the second bus, write transactions will be coupled on a first connection path of the second bus and read transactions will be coupled on a second connection path of the second bus, and the order between reads and write may change. Therefore, the bridge may include control logic for maintaining an order between the write and read transactions of each source of the SoC.

In one embodiment, the control logic of the bridge may include a pair of counters for each source in the SoC. The pair of counters may include a read counter and a write counter for a given source. When a read transaction of the given source is received and processed by the bridge, the corresponding read counter may be incremented, and when a response to the read transaction is received, then the read counter may be decremented. Similarly, when a write transaction generated by a given source is received and processed by the bridge, the corresponding write counter may be incremented, and when a response to the write transaction is received, then the write counter may be decremented.

To enforce the order of transactions as they are sent on the second bus, when a transaction is received from a given source at the bridge on the first bus, the transaction may be held up as long as the opposite counter for the given source is non-zero. For example, when a write transaction is received from a first source at the bridge, the read counter for the given source may be queried. If the read counter is non-zero, indicating that there is still at least one read transaction in-flight for the given source, then the write transaction may be stalled until all in-flight read transactions are completed. The bridge will eventually receive response(s) for the outstanding read transaction(s) indicating that the read transaction(s) have been completed. Each time a read transaction is completed, the read counter may be decremented. Once all of the outstanding read transaction(s) are completed, and the read counter is zero, then the write transaction that was delayed may then be allowed to proceed. Similarly, a read transaction that is received when the corresponding write counter is non-zero may be stalled until the write counter is zero.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a bridge . . . ." Such a claim does not foreclose the apparatus from including additional components (e.g., a processor complex, a memory device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
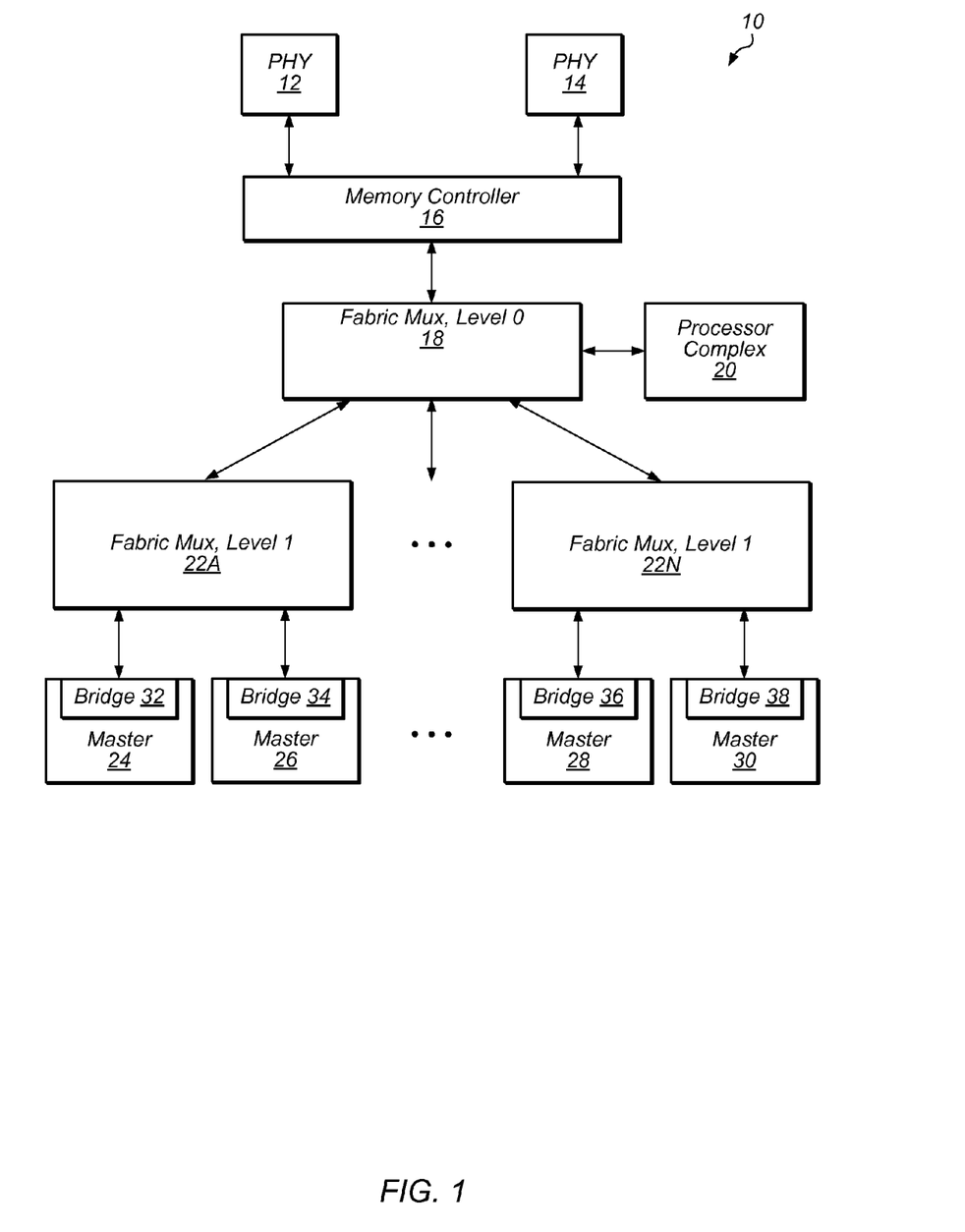
FIG. 1 is a block diagram illustrating one embodiment of a portion of an integrated circuit (IC).

Referring now to FIG. 1, a block diagram illustrating one embodiment of a portion of an integrated circuit (IC) is shown. In the illustrated embodiment, IC 10 includes processor complex 20, level 0 fabric mux 18, level 1 fabric muxes 22A-N, masters 24, 26, 28, and 30, memory controller 16, and memory physical interface circuits (PHYs) 12 and 14. It is noted that IC 10 may also include many other components not shown in FIG. 1. In various embodiments, IC 10 may also be referred to as a system on chip (SoC), an application specific integrated circuit (ASIC), or an apparatus. Clock sources, such as phase lock loops (PLLs), and power sources are not shown for ease of illustration. Components shown within IC 10 may be coupled to each other using any suitable bus and/or interface mechanism.

Processor complex 20 may include any number of central processing units (CPUs) (not shown), a supporting cache hierarchy including a level two (L2) cache (not shown), and a variety of other components and logic. The CPU(s) of processor complex 20 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, level 0 fabric mux 18 and level 1 fabric muxes 22A-N may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

As shown in FIG. 1, level 1 fabric muxes 22A and 22N may be coupled to masters. Masters 24, 26, 28, and 30 may include bridges 32, 34, 36, and 38, respectively, for communicating with level 1 fabric muxes 22A and 22N. Level 1 fabric muxes 22A and 22N may utilize a first type of bus protocol for transferring data while masters 24, 26, 28, and 30 may utilize a second type of bus protocol for transferring data. Therefore, bridges 32, 34, 36, and 38 may facilitate communications between these different types of bus protocols. Bridges 32, 34, 36, and 38 may be configured to convert requests and responses as they go back and forth over different types of bus protocols. Bridges 32, 34, 36, and 38 may also be configured to enforce an order between the read and write transactions of a given source. In other embodiments, additional bridges may be located in other locations within IC 10.

In various embodiments, IC 10 may also include circuitry in the fabric to ensure coherence among different masters and other I/O devices. This circuitry may include cache coherency logic employing a cache coherency protocol to ensure data accessed by each master is kept up to date. An example of a cache coherency protocol includes the MOESI protocol with the Modified (M), Owned (O), Exclusive (E), Shared (S), and Invalid (I) states.

Masters 24-30 are representative of any number and type of components which may be coupled to the fabric of IC 10. For example, masters 24-30 may include one or more cameras, flash controllers, display controllers, media controllers, graphics units, and/or other devices. Masters 24-30 are also representative of any number of I/O interfaces or devices and may provide interfaces to any type of peripheral device implementing any hardware functionality included in the system. For example, any of the masters 24-30 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
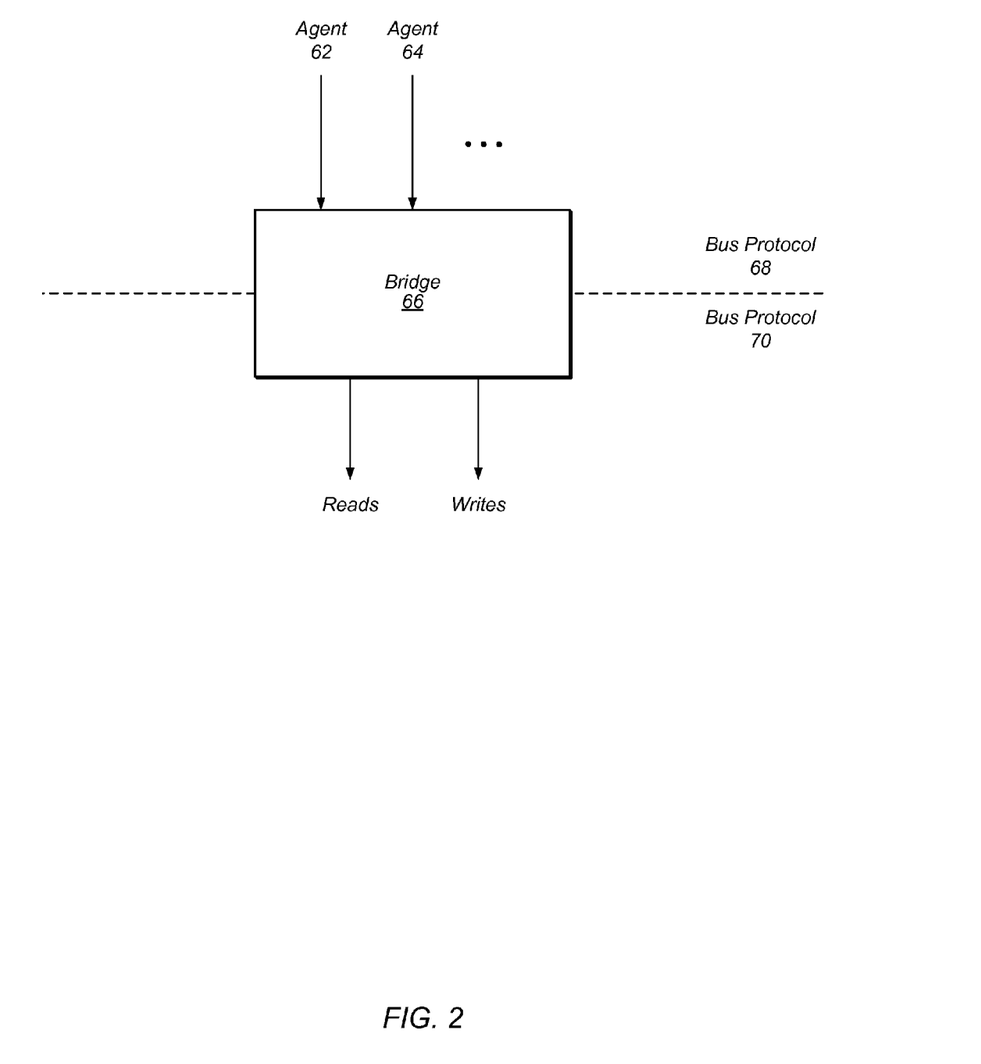
FIG. 2 is a block diagram of one embodiment of a bridge.

Turning now to FIG. 2, a block diagram of one embodiment of a bridge within a SoC is shown. Bridge 66 may provide the connection and bus conversion between two separate bus protocols, bus protocol 68 and bus protocol 70. The way in which transactions are sent on the paths of the bus fabric of the SoC may depend on the particular kind of bus protocol employed within a particular region of the bus fabric. Bus protocol 68 may be a first type of bus protocol which utilizes a shared bus for read and write transactions. Bus protocol 70 may be a second type of bus protocol which utilizes a first path for read transactions and a second path for write transactions.

Bridge 66 is connected to agents 62 and 64 on a first bus, represented by bus protocol 68. Agents 62 and 64 are representative of any number of agents or components that may be connected to bridge 66. While only two agents are shown connected to bridge 66, this is for illustrative purposes only, and in other embodiments, other numbers of agents may be connected to bridge 66. For each agent on the first bus utilizing bus protocol 68, all transactions may be sent to bridge 66 on a single path. It is noted that the term "transaction" may be used to refer to a "memory transaction", "input/output (I/O) transaction", or other type of transaction. It is also noted that the terms "request" and "transaction" may be used interchangeably herein.

Bridge 66 may receive transactions from agents 62 and 64, respectively, and then convert the transactions to be compatible with bus protocol 70. Then, bridge 66 may forward these transactions to the targeted destination using bus protocol 70.

One or more agents or devices (not shown) may be coupled to bridge 66 in the region indicated by bus protocol 70. The connections to these devices may include separate pathways for read and write transactions. Bridge 66 may route read transactions on a read pathway and route write transactions onto a write pathway to the targeted device.

The order between read and write transactions may be maintained on the connection to bridge 66 from agents 62 and 64 since both read and write transactions are routed on a shared pathway. However, when being sent to the targeted devices using bus protocol 70, the read transactions take a first path and the write transactions take a second path, which may result in transactions being processed out of order. Therefore, bridge 66 may include control logic for ensuring the read and write transactions from the same source are completed in the correct order. The control logic (not shown) may include counters for each source (e.g., agent 62, agent 64) coupled to bridge 66.

In one embodiment, bus protocol 68 may be a proprietary bus interface. The specific details (e.g., data width, signal definition) of the proprietary bus interface may vary depending on the embodiment. In other embodiments, bus protocol 68 may be any of a variety of commonly used industry standard bus protocols. In one embodiment, bus protocol 70 may be an ARM Holdings' Advanced Microcontroller Bus Architecture (AMBA®) protocol. For example, bus protocol 70 may be an Advanced eXtensible Interface (AXI) bus protocol. In other embodiments, bus protocol 70 may be any other suitable type of protocol to manage the interface between components. For an embodiment utilizing the AXI bus protocol as bus protocol 70, the read path may be split up into a read address path and a read data path. Similarly, the write path may be split up into a write address path and a write data path. However, for ease of illustration, only a single path is shown for reads and only a single path is shown for writes.

In one embodiment, bridge 66 may convert transactions from bus protocol 68 to be compliant with bus protocol 70. Bridge 66 may also convert responses and requests going from bus protocol 68 to bus protocol 70. In one embodiment, bridge 66 may convert a source identifier (ID) of a transaction to another ID for use within the bus fabric utilizing bus protocol 70. For some of the source IDs within bus protocol 68, there may be a one-to-one mapping to a specific ID within bus protocol 70. For other source IDs, multiple source IDs within bus protocol 68 may be mapped to a single converted ID within bus protocol 70. Bridge 66 may enforce an ordering between read and write transactions to match the order between read and write transactions that are received by bridge 66 on bus protocol 68. This order may be enforced according to the converted-source IDs. In one embodiment, if there are any outstanding read transactions for a given converted-source ID, then an incoming write transaction for the given converted-source ID may be stalled going downstream from bus protocol 68 to bus protocol 70. Similarly, if there are any outstanding write transactions for a given converted-source ID, then an incoming read transaction for the given converted-source ID may be stalled going downstream from bus protocol 68 to bus protocol 70. The stalling of transactions in the downstream direction may not affect responses and requests going upstream from bus protocol 70 to bus protocol 68. Therefore, responses and requests may still flow upstream with no blockage even if read or write transactions are being stalled in the downstream direction.

Figure 3:
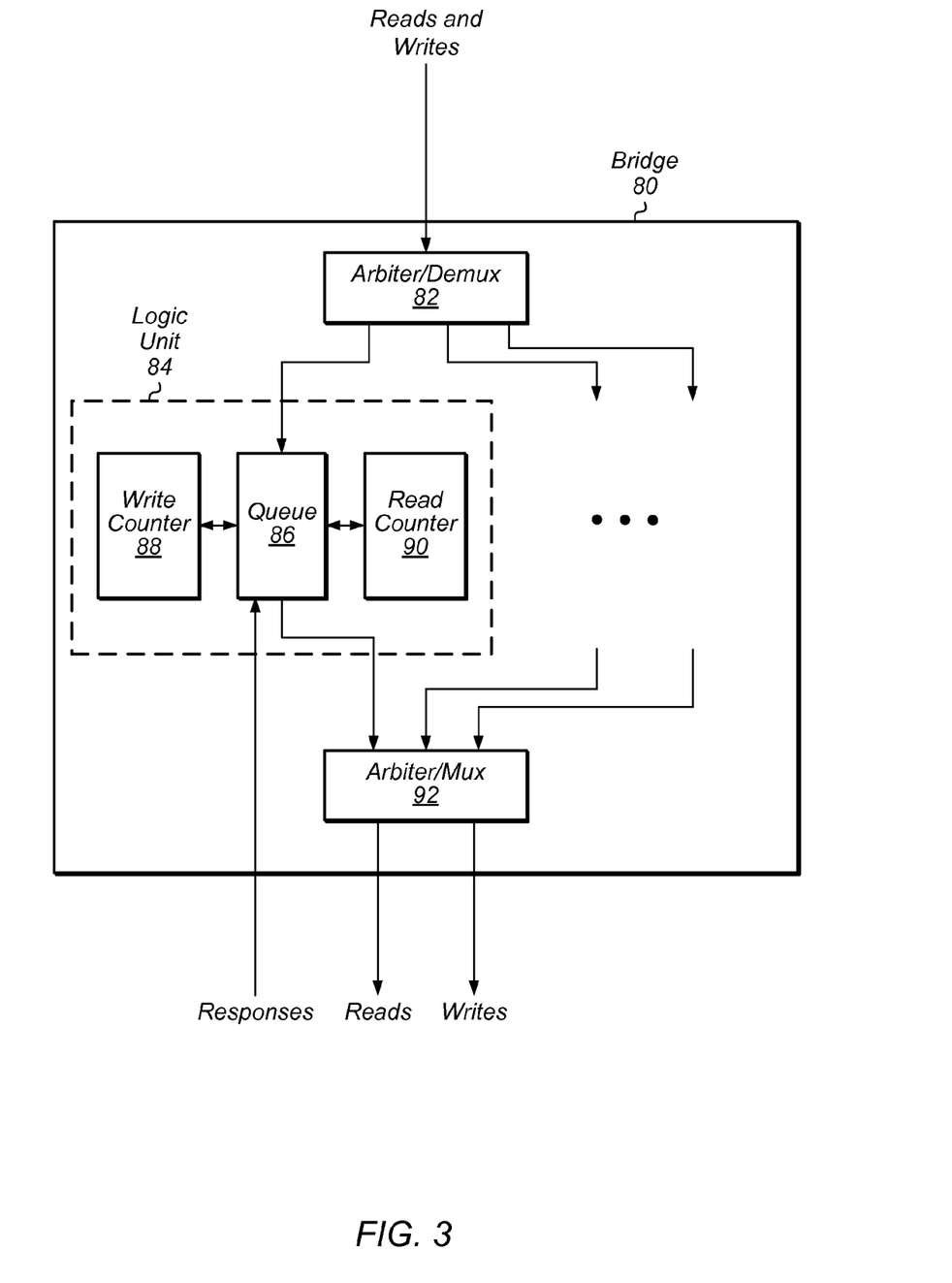
FIG. 3 is a block diagram of one embodiment of a portion of the logic in a bridge.

Referring now to FIG. 3, a block diagram of one embodiment of a portion of the control logic within a bridge is shown. Bridge 80 may include control logic for maintaining an order of transactions per source. While only a single logic unit is shown in FIG. 3, logic unit 84, it is noted that bridge 80 may include any number of logic units corresponding to any number of agents that send transactions to bridge 80. Each of these logic units may include similar logic to that shown in logic unit 84. Logic unit 84 may include logic for maintaining the order of transactions for the respective source. Bridge 80 may also include other logic not shown in FIG. 3 to avoid obscuring the figure. For example, bridge 80 may include logic for converting transactions and responses from a first bus protocol to a second bus protocol and vice versa.

When a transaction from the source corresponding to logic unit 84 is received by bridge 80, arbiter/demux 82 may route the transaction to control unit 84 based on the source of the transaction. Other transactions from other sources may be routed by switch 82 to their respective logic units (not shown). Logic unit 84 may include queue 86, write counter 88, and read counter 90. Write counter 88 and read counter 90 may track the number of outstanding write and read transactions, respectively, for the given source. Queue 86 may be any size of queue with any number of entries and fields per entry for storing transactions. In one embodiment, queue 86 may be first-in, first-out (FIFO) queues.

When a transaction is received by logic unit 84, the transaction may be written to queue 86 and enqueued with any other previously received transactions. Queue 86 may determine if write counter 88 is zero prior to reading a read transaction out of queue 86. If write counter 88 is non-zero, which means there is at least one outstanding write transaction for the given source, then queue 86 may hold up the next read transaction until write counter 88 is zero. Similarly, queue 86 may determine if read counter 90 is zero prior to reading a write transaction out of queue 86. If read counter 90 is non-zero, which means there is at least one outstanding read transaction for the given source, then queue 86 may hold up the next write transaction until read counter 90 is zero. Read and write transactions may be sent from logic unit 84 and other logic units to arbiter/mux 92 and then sent to the targeted destination.

When a read transaction is read out of queue 86, read counter 90 may be incremented. Similarly, when a write transaction is read out of queue 86, write counter 88 may be incremented. When a response is received back for a transaction, indicating that the transaction has been completed, the corresponding counter may be decremented. It is noted that the logic shown in logic unit 84 is only one possible implementation of logic for maintaining an order of read and write transactions for a given source. In other embodiments, the logic utilized within logic unit 84 may differ from that shown in FIG. 3.

Figure 4:
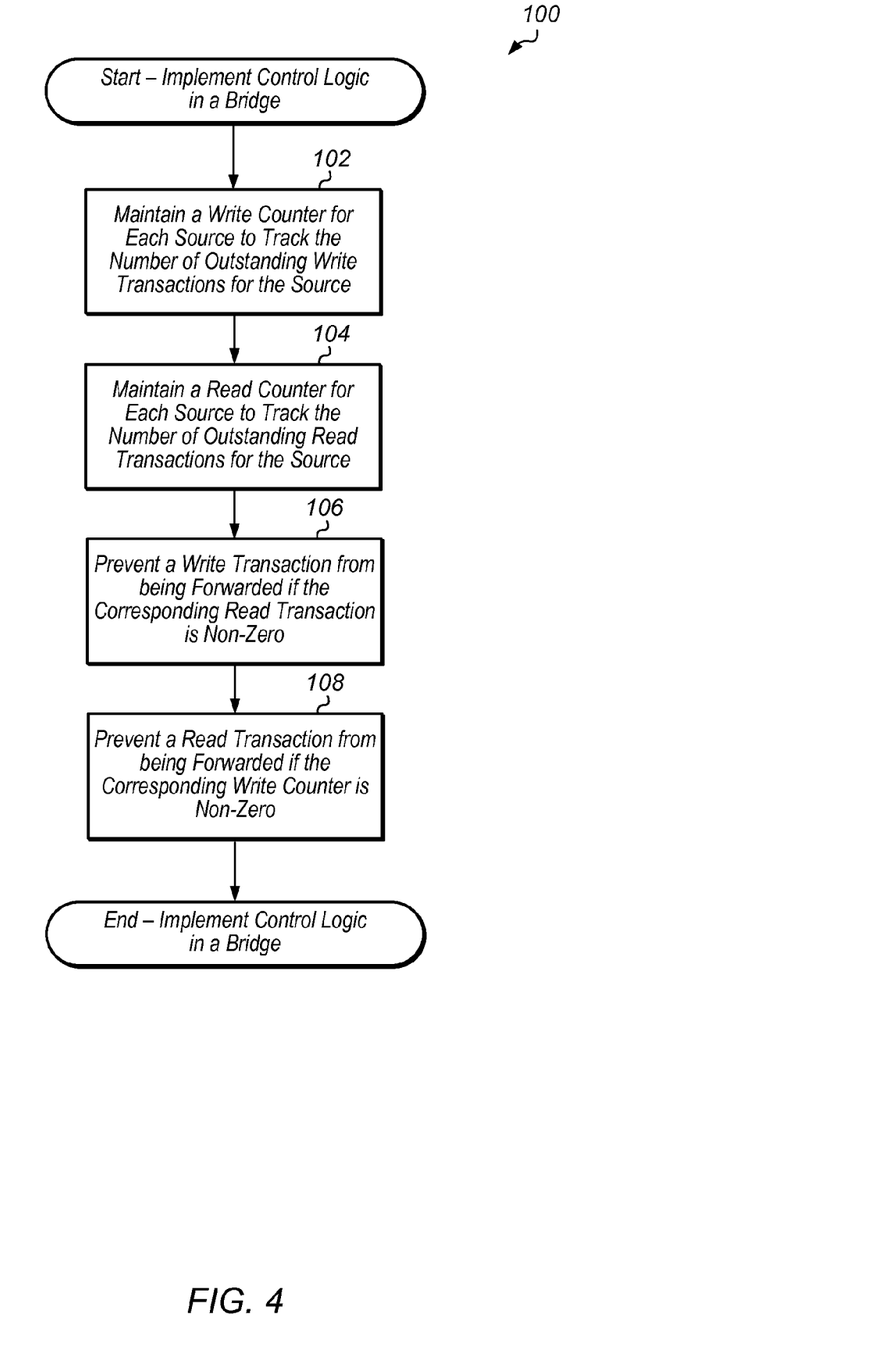
FIG. 4 is a generalized flow diagram illustrating one embodiment of a method for implementing control logic within a bridge.

Referring now to FIG. 4, one embodiment of a method 100 for implementing control logic in a bridge circuit is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, for each source in a SoC, a write counter may be maintained in the control logic of a bridge to track the number of outstanding write transactions from the respective source (block 102). The bridge may connect a first bus to a second bus. The first bus may utilize a single path for sending read and write transactions, while the second bus may utilize separate paths for read and write transactions. The write counter may increment when a write transaction is forwarded from the bridge and decrement when a response is received for the write transaction, with the response indicating that the write transaction has been completed.

For each source in the SoC, a read counter may be maintained in the control logic of the bridge to track a number of outstanding read transactions from the respective source (block 104). The read counter may increment when a read transaction is forwarded from the bridge and decrement when a response is received for the read transaction. Each source may have its own read and write counter in the control logic of the bridge. For example, in an embodiment with four separate sources in the SoC, there may be four separate read counters and four separate write counters in the control logic of the bridge.

The control logic may prevent a write transaction from being forwarded from the bridge if the corresponding read counter is non-zero (block 106). For example, a first source may be a first CPU, and the first CPU may forward a write transaction to the bridge, and if the read counter for the first CPU is non-zero, then the write transaction may be held up at the bridge until the read counter is zero. Similarly, the control logic may prevent a read transaction from being forwarded from the bridge if the corresponding write counter is non-zero (block 108). In this way, the control logic may ensure that the order of transactions from the same source is maintained when passing through the bridge from the first bus to the second bus. After block 108, method 100 may end.

Figure 5:
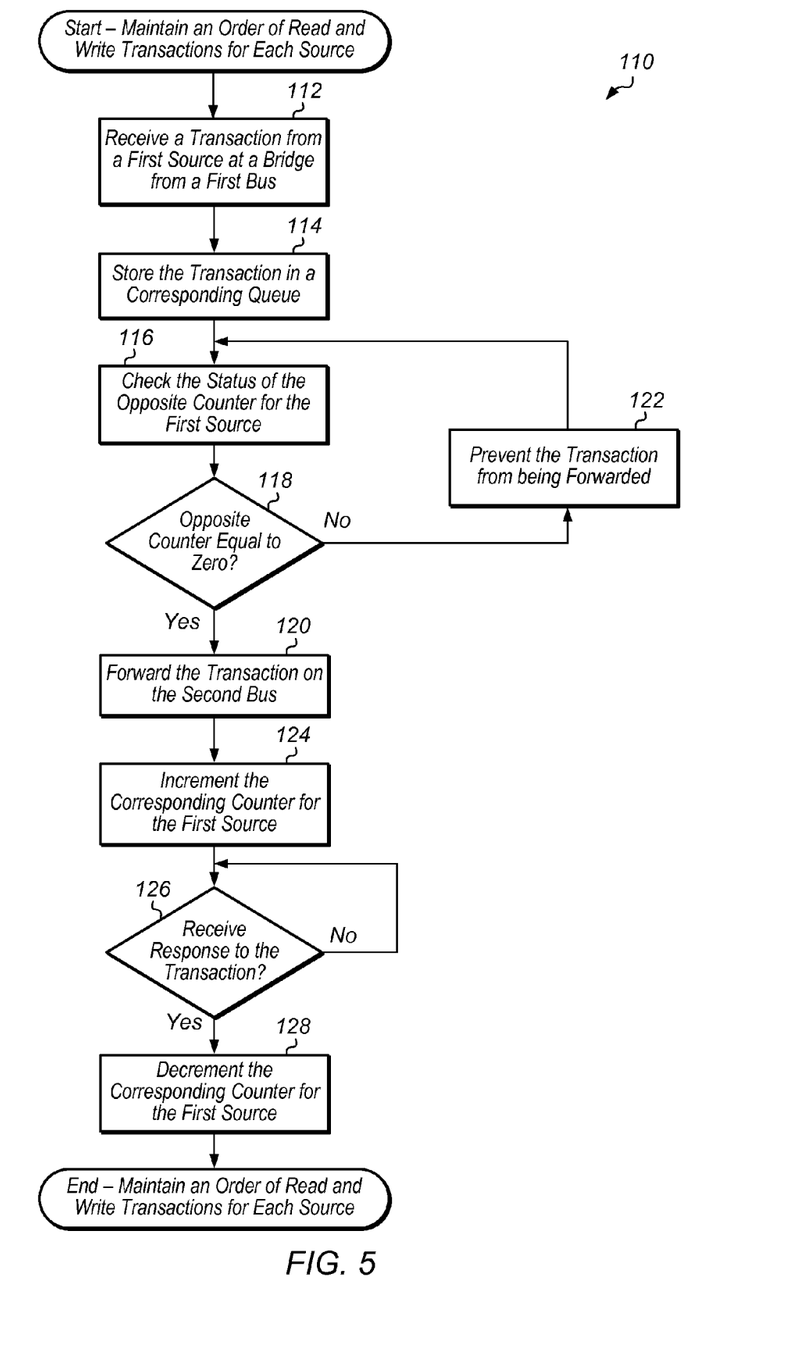
FIG. 5 is a generalized flow diagram illustrating one embodiment of a method for maintaining an order between read and write transactions passing through a bridge for each source.

Referring now to FIG. 5, one embodiment of a method 110 for maintaining an order of read and write transactions per source passing through a bridge is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a transaction from a first source may be received at a bridge (block 112). The transaction may be a read or a write transaction, and the transaction may be received from a first bus coupled to the bridge. The first bus may utilize a single, combined path for forwarding read and write transactions to the bridge. The transaction may be stored in a first-in, first-out (FIFO) queue assigned to the first source (block 114). Each source in the SoC may have its own queue for storing its transactions.

Next, when the queue selects a transaction as the next in line to be forwarded to its destination, the control logic of the bridge may check the status of the opposite counter for the first source (block 116). For example, for a write transaction, the control logic may check the status of the read counter and for a read transaction, the control logic may check the status of the write counter. If the opposite counter for the first source is zero (conditional block 118, "yes" leg), then the control logic may forward the transaction onto the corresponding path of the second bus toward its destination (block 120). For example, the second bus may have a read path and a write path, and reads may be forwarded on the read path while writes may be forwarded on the write path.

If the opposite counter for the first source is non-zero (conditional block 118, "no" leg), then the control logic may stall the transaction and prevent the transaction from being forwarded on the second bus (block 122). After block 122, method 110 may return to block 116 to re-check the status of the opposite counter for the first source. After block 120, the corresponding first source counter may be incremented (block 124). For example, if the transaction is a write transaction, then the write counter for the first source may be incremented and if the transaction is a read transaction, then the read counter for the first source may be incremented. Although block 124 is shown as occurring after block 120, it is noted that these two blocks may be performed simultaneously, or block 124 may be performed prior to block 120, depending on the embodiment.

Then, if a response to the transaction has been received from the second bus (conditional block 126, "yes" leg), then the corresponding first source counter may be decremented (block 128). After block 128, method 110 may end. If a response to the transaction has not been received from the second bus (conditional block 126, "yes" leg), then method 110 may wait at conditional block 126 until a response is received. It is noted that any amount of time may elapse between forwarding the transaction and receiving the response to the transaction, and that many other transactions may be received during this period of time. Therefore, method 110 may be performed in parallel for any number of transactions, and while waiting for a response for one transaction, multiple other transactions may be received and processed in accordance with the steps of method 110.

Figure 6:
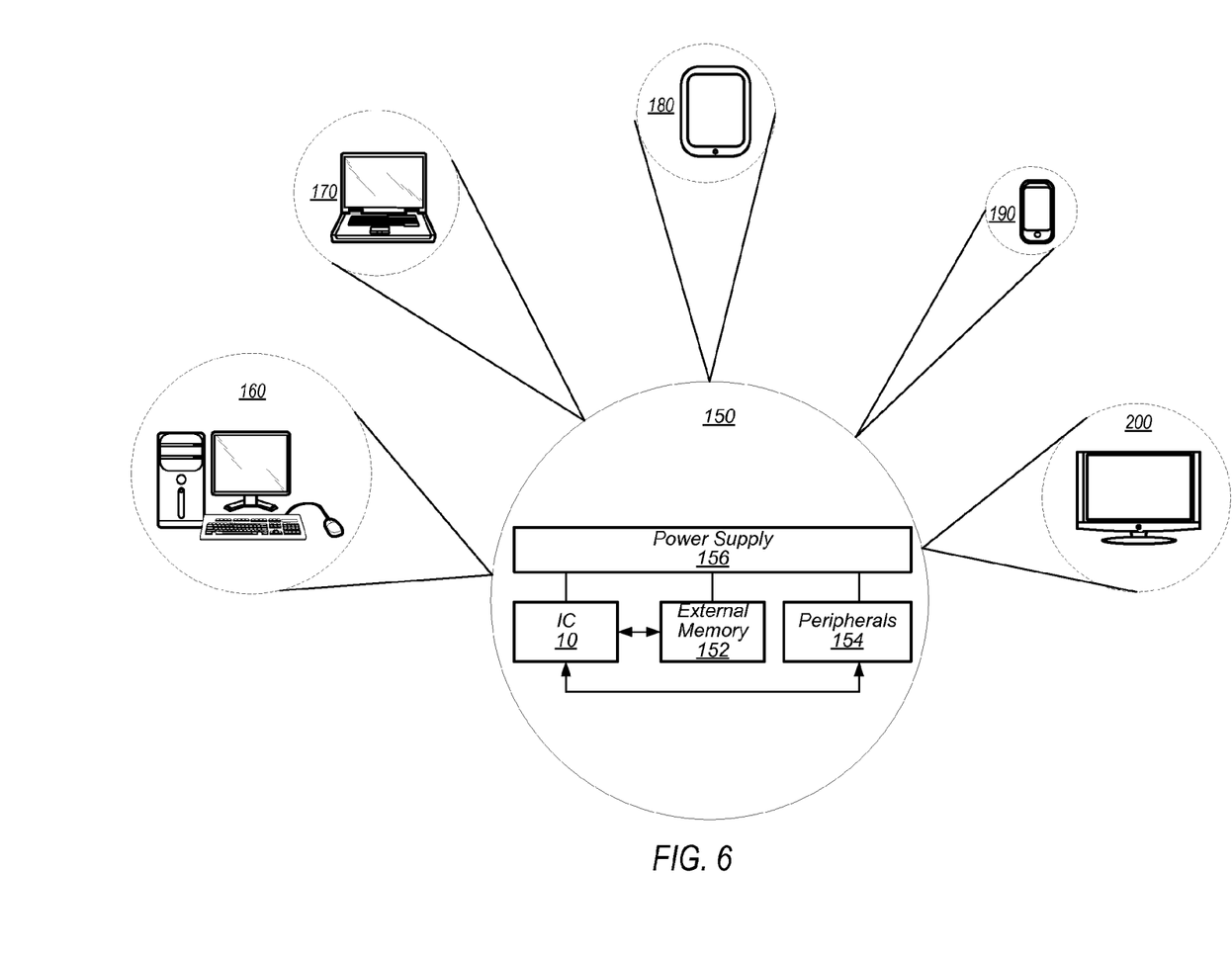
FIG. 6 is a block diagram of one embodiment of a system.

Turning now to FIG. 6, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. In the illustrated embodiment, the system 150 includes at least one instance of IC 10 (of FIG. 1) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc.

Figure 7:
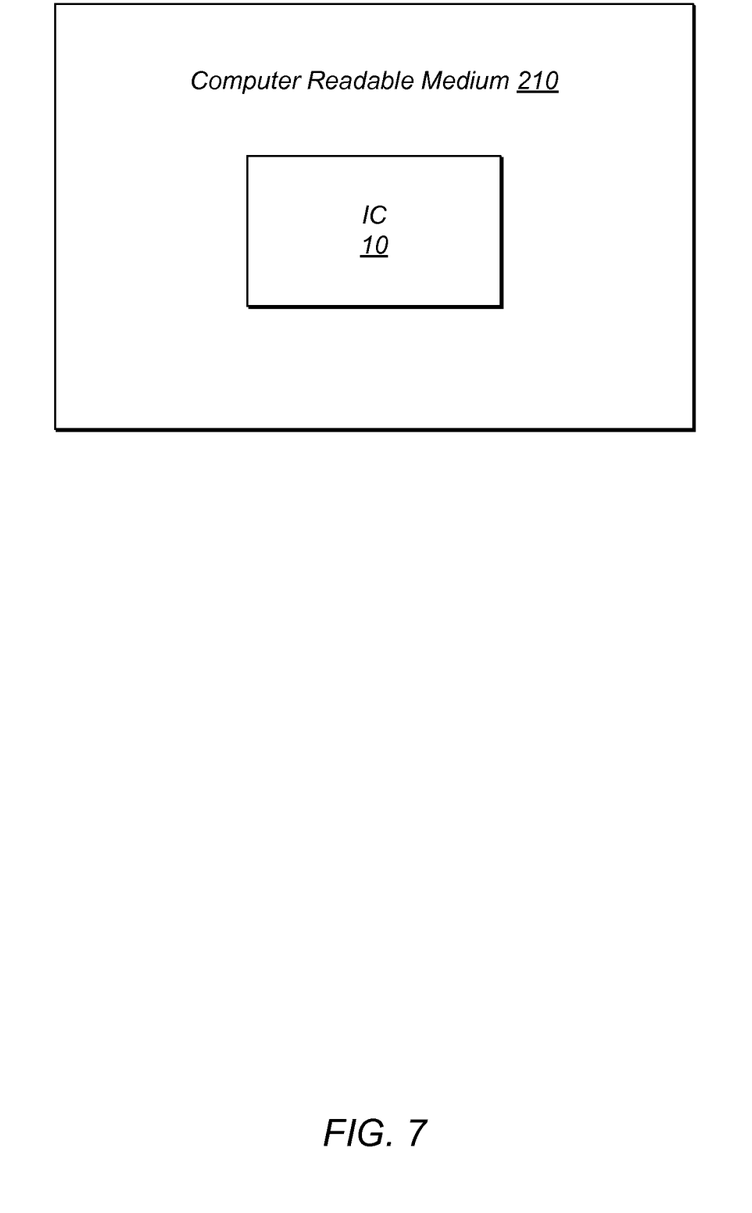
FIG. 7 is a block diagram of one embodiment of a computer readable medium.

Referring now to FIG. 7, one embodiment of a block diagram of a computer readable medium 210 including one or more data structures representative of the circuitry included in IC 10 (of FIG. 1) is shown. Generally speaking, computer readable medium 210 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 210 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 210 may be the netlist(s) (with or without the synthesis library) or the data set(s), as desired. In yet another alternative, the data structures may comprise the output of a schematic program, or netlist(s) or data set(s) derived therefrom. While computer readable medium 210 includes a representation of IC 10, other embodiments may include a representation of any portion or combination of portions of IC 10 (e.g., bridge 32).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A bridge circuit comprising control logic, wherein the control logic is configured to:
   maintain a pair of counters for each agent of a plurality of agents, wherein each pair of counters comprises a write counter and a read counter, wherein the write counter tracks a number of outstanding write transactions for a respective agent, and wherein the read counter tracks a number of outstanding read transactions for the respective agent;
   forward a read transaction from a given agent out of the bridge circuit only if the write counter for the given agent is equal to zero; and
   forward a write transaction from the given agent out of the bridge circuit only if the read counter for the given agent is equal to zero.

2. The bridge circuit as recited in claim 1, wherein the bridge circuit connects a first bus to a second bus, wherein the first bus transfers read and write transactions on a single path, wherein the second bus comprises two paths, and wherein the second bus routes read transactions to a first path and routes write transactions to a second path.

3. The bridge circuit as recited in claim 2, wherein for each pair of counters, the control logic is configured to:
   increment the read counter responsive to receiving a read transaction at the bridge circuit from a respective agent;
   decrement the read counter responsive to receiving a response for the read transaction;

increment the write counter responsive to receiving a write transaction at the bridge circuit from the respective agent; and decrement the write counter responsive to receiving a response for the write transaction.

4. The bridge circuit as recited in claim 3, wherein the plurality of agents are connected to the bridge circuit via the first bus.

5. The bridge circuit as recited in claim 4, wherein the control logic comprises a queue for each agent, and wherein each queue is configured to store read and write transactions received from a respective agent.

6. The bridge circuit as recited in claim 5, wherein the queue is a first-in, first-out (FIFO) structure.

7. A method comprising:
maintaining a write counter in a bridge, wherein the write counter tracks a number of outstanding write transactions from a first source;
maintaining a read counter in the bridge, wherein the read counter tracks a number of outstanding read transactions from the first source;
preventing a write transaction from the first source from being sent out of the bridge responsive to determining the read counter is non-zero; and
preventing a read transaction from the first source from being sent out of the bridge responsive to determining the write counter is non-zero.

8. The method as recited in claim 7, wherein the bridge connects a first bus to a second bus, and wherein the first source is connected to the bridge via the first bus.

9. The method as recited in claim 8, wherein the first bus has a single path for read and write transactions.

10. The method as recited in claim 9, wherein the second bus has a first path for read transactions and a second path for write transactions.

11. The method as recited in claim 10, further comprising:
allowing a write transaction from the first source to be sent out of the bridge responsive to determining the read counter is zero; and
allowing a read transaction from the first source to be sent out of the bridge responsive to determining the write counter is zero.

12. A method comprising:
receiving a write transaction at a bridge from a first source;
storing the write transaction in a queue corresponding to the first source;
checking a read counter corresponding to the first source prior to sending the write transaction out of the bridge, wherein the read counter tracks a number of outstanding read transactions for the first source; and
preventing the write transaction from being sent out of the bridge responsive to determining the read counter is non-zero.

13. The method as recited in claim 12, wherein the queue only stores transactions from the first source, and wherein the queue is a first-in, first-out (FIFO) queue.

14. The method as recited in claim 13, further comprising sending the write transaction out of the bridge responsive to determining the read counter is zero.

15. The method as recited in claim 14, further comprising incrementing a write counter corresponding to the first source responsive to sending the write transaction out of the bridge, wherein the write counter tracks a number of outstanding write transactions for the first source.

16. The method as recited in claim 15, further comprising decrementing the write counter responsive to receiving a response for the write transaction.

17. The method as recited in claim 16, further comprising:
receiving a read transaction at the bridge from the first source;
storing the read transaction in the queue;
checking the write counter prior to sending the read transaction out of the bridge; and
preventing the read transaction from being sent out of the bridge responsive to determining the write counter is non-zero.

18. The method as recited in claim 17, further comprising sending the read transaction out of the bridge responsive to determining the write counter is zero.

19. The method as recited in claim 18, further comprising incrementing the read counter responsive to sending the read transaction out of the bridge.

20. The method as recited in claim 19, further comprising decrementing the read counter responsive to receiving a response for the read transaction.

21. An apparatus comprising:
two or more agents; and
a bridge coupled to the two or more agents, wherein the bridge comprises control logic, and wherein the control logic is configured to:
track a number of outstanding write transactions for a first agent;
track a number of outstanding read transactions for the first agent;
send a write transaction from the first agent to a second agent responsive to determining the number of outstanding read transactions for the first agent is zero; and
send a read transaction from the first agent to the second agent responsive to determining the number of outstanding write transactions for the first agent is zero.

22. The apparatus as recited in claim 21, wherein the first agent is coupled to the bridge via a first bus, and wherein the second agent is coupled to the bridge via a second bus.

23. The apparatus as recited in claim 22, wherein the first bus has a single path for read and write transactions, and wherein the second bus has a first path for read transactions and a second path for write transactions.

24. The apparatus as recited in claim 23, wherein the control logic is further configured to:
prevent a write transaction from being sent from the first agent to the second agent responsive to determining the number of outstanding read transactions for the first agent is non-zero; and
prevent a read transaction from being sent from the first agent to the second agent responsive to determining the number of outstanding write transactions for the first agent is zero.

* * * * *